(12) United States Patent
Chauhan et al.

(10) Patent No.: US 12,435,893 B2
(45) Date of Patent: Oct. 7, 2025

(54) SYSTEM AND METHOD FOR AUTOMATIC DETECTION AND CLUSTERING OF VARIABLE AIR VOLUME UNITS IN A BUILDING MANAGEMENT SYSTEM

(71) Applicant: Tyco Fire & Security GmbH, Neuhausen am Rheinfall (CH)

(72) Inventors: Amit Chauhan, Wardha (IN); Suvam Saha, Kolkata (IN); Mugdha Parag Kavi, Pune (IN); Shrey Ostwal, Ahmednagar (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 715 days.

(21) Appl. No.: 17/399,576

(22) Filed: Aug. 11, 2021

(65) Prior Publication Data

US 2022/0049868 A1    Feb. 17, 2022

(30) Foreign Application Priority Data

Aug. 14, 2020 (IN) .............................. 202021034976

(51) Int. Cl.
*F24F 11/32*     (2018.01)
*F24F 7/06*      (2006.01)
(Continued)

(52) U.S. Cl.
CPC ................ *F24F 11/32* (2018.01); *F24F 7/06* (2013.01); *F24F 11/0001* (2013.01); *F24F 11/63* (2018.01); *G06N 20/00* (2019.01)

(58) Field of Classification Search
CPC ........ F24F 11/00; F24F 11/0001; F24F 11/32; F24F 11/52; F24F 11/54; F24F 11/58; F24F 11/63; F24F 11/64; F24F 11/72; F24F 11/77; F24F 11/88; F24F 3/001; F24F 7/06; F24F 2003/003; F24F 2110/12; F24F 2110/22; G06N 20/00; Y02B 30/70
See application file for complete search history.

(56) References Cited

U.S. PATENT DOCUMENTS 5,863,246 A    1/1999   Bujak
9,447,985 B2   9/2016   Johnson
(Continued)

FOREIGN PATENT DOCUMENTS

CA    2957726 A1    3/2016
CA    3043996 A1    2/2018
(Continued)

OTHER PUBLICATIONS

JP 2000-357012 A (publ. Dec. 26, 2000), machine translation.*
(Continued)

*Primary Examiner* — M. N. Von Buhr
(74) *Attorney, Agent, or Firm* — Foley & Lardner LLP

(57) ABSTRACT

System and methods for automatic detection and clustering of variable air volume units in a building management system are disclosed. In one aspect, a method includes receiving one or more of variable air volume unit (VAV) data and an air handling unit (AHU) data from one or more data sources, determining one or more VAVs as a suspect VAV based on the VAV data and the AHU data, and removing the suspect VAV to determine a duct static pressure setpoint for an AHU.

20 Claims, 8 Drawing Sheets

(51) Int. Cl.
   *F24F 11/00* (2018.01)
   *F24F 11/63* (2018.01)
   *G06N 20/00* (2019.01)

(56) References Cited

U.S. PATENT DOCUMENTS

| | | | |
|---|---|---|---|
| 9,638,435 B2* | 5/2017 | Ambriz | F24F 11/526 |
| 10,274,540 B2* | 4/2019 | Bocage | G01R 31/008 |
| 10,591,174 B2* | 3/2020 | Bandyopadhyay | F24F 11/30 |
| 10,733,536 B2* | 8/2020 | Bates | G06N 3/084 |
| 10,767,886 B2* | 9/2020 | Alanqar | F24F 11/0001 |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 11,216,329 B2* | 1/2022 | Alves | G06F 11/0736 |
| 11,268,716 B2* | 3/2022 | Bandyopadhyay | F24F 11/58 |
| 11,451,043 B1* | 9/2022 | Olander | G01R 19/2513 |
| 11,774,125 B2* | 10/2023 | Bandyopadhyay | F24F 11/70 700/276 |
| 11,861,309 B2* | 1/2024 | Wiranata | G06N 20/00 |
| 11,861,716 B1* | 1/2024 | Olander | H02J 3/06 |
| 2015/0227870 A1 | 8/2015 | Noboa et al. | |
| 2017/0169342 A1* | 6/2017 | Waltinger | G06F 11/008 |
| 2018/0292098 A1* | 10/2018 | Bandyopadhyay | G05B 19/0426 |

FOREIGN PATENT DOCUMENTS

| | | |
|---|---|---|
| CN | 101008519 A | 8/2007 |
| CN | 101303153 A | 11/2008 |
| CN | 107305353 A | 10/2017 |
| CN | 107576519 A | 1/2018 |
| CN | 108469097 A | 8/2018 |
| CN | 111256338 A | 6/2020 |
| EP | 3 186 687 A4 | 7/2017 |
| EP | 3 497 377 A1 | 6/2019 |
| JP | 2000-357012 A | 12/2000 |

OTHER PUBLICATIONS

CN 111256338 A (publ Jun. 9, 2020), machine translation.*
Chinese Office Action on CN Appl. No. 202110931220.6 dated Jun. 13, 2023 (12 pages with English language translation).
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid

(56) References Cited

OTHER PUBLICATIONS

State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Chinese Office Action on CN Appl. No. 202110931220.6 dated Nov. 1, 2022 (6 pages).

Chinese Office Action on CN Appl. No. 202110931220.6 dated Feb. 6, 2024 (39 pages with English language translation).

Xu et al., "Graduation Design Guidance for Building Environment and Energy Application Engineering," China Machine Press, Jan. 31, 2020 (8 pages with English language translation).

Chinese Office Action on CN Application No. 202110931220.6 dated Nov. 13, 2023 (23 pages with English language translation).

Wang, H., "Method and Application Research on Online Fault Detection and Diagnosis for Variable-Air-Volume Air-Conditioning Systems," Doctoral Dissertation, Hunan University, China, 2011 (122 pages with English language abstract).

Zhu et al., "Analysis of Common Problems in Refrigeration Stations and Air-Conditioning Systems," HVAC 06, Dec. 15, 2000 (8 pages with English language abstract).

\* cited by examiner

| AHU | Rogue VAV | Undersized VAV | Oversized VAV | Effective DPT-SP |
|---|---|---|---|---|
| AHU – 1 | 1 | 1 | 2 | 280 pa |
| AHU – 2 | 3 | 2 | 1 | 330 pa |
| AHU – 3 | 2 | 1 | 0 | 250 pa |
| AHU – 4 | 1 | 1 | 1 | 275 pa |
| AHU – 5 | 1 | 2 | 2 | 345 pa |
| AHU – 6 | 3 | 1 | 0 | 295 pa |

VAV-6-11
VAV-6-09
VAV-6-01

FIG. 8

SYSTEM AND METHOD FOR AUTOMATIC DETECTION AND CLUSTERING OF VARIABLE AIR VOLUME UNITS IN A BUILDING MANAGEMENT SYSTEM

CROSS-REFERENCE TO RELATED APPLICATION(S)

This application claims the benefit of and the priority of Indian Provisional Patent Application No. 2020/21034976, filed on Aug. 14, 2020, the entire disclosure of which is incorporated by reference herein.

BACKGROUND

The present disclosure relates, generally, to heating, ventilation, and air conditioning (HVAC) systems for a building and more specifically to air handling units (AHUs) and variable air volume units (VAVs or VAV units) in a building HVAC system.

A building management system (BMS) is, in general, a system of devices configured to control, monitor, and manage equipment in or around a building or a building area. A BMS can include HVAC systems, security systems, lighting systems, fire alerting systems, another system that is capable of managing building functions or devices, or any combinations thereof. BMS devices can be installed in any environment (e.g., an indoor area or an outdoor area) and the environment can include any number of buildings, spaces, zones, rooms, or areas. A BMS can include a variety of devices (e.g., HVAC devices, controllers, chillers, fans, sensors, etc.) configured to facilitate monitoring and controlling the building space. Throughout this disclosure, such devices are referred to as BMS devices or building equipment.

Rogue VAVs are VAVs that drive the reset algorithm to extreme setpoints and thus defeat energy savings as the rogue VAVs are never satisfied irrespective of the fan speed. Typically, in HVAC systems with large number of zones, there is usually at least a couple of rogue VAVs. The presence of even a single rogue VAV or an undersized VAV in the HVAC system could result in thousands of dollars of lost energy on an annual basis.

Typical BMS systems are incapable of identifying rogue VAVs. For example, rogue VAVs can be identified and highlighted to facility manager(s) by an energy management system who, in turn, can create work orders for fixing such VAVs. The work order(s) in turn gets assigned to a technician who determines the cause for erratic behavior and then implements a pressure setpoint reset logic at a controller level by excluding the rogue VAVs. This process is time consuming, and implementing the reset logic at a controller level leads to huge efforts on the technician's part to program the controllers. In short, the identification of rogue VAVs and implementation of an AHU's static pressure setpoint reset at the controller level is a manual and expensive process.

There is, therefore, a need to provide a system and method for automatic detection and clustering of VAVs which alleviates the drawback(s) mentioned above and facilitates AHU static pressure set point reset optimization.

SUMMARY

One aspect of the disclosure is a building management system including: one or more memory devices configured to store instructions thereon that, when executed by one or more processors, cause the one or more processors to: receive one or more of variable air volume unit (VAV) data or air handling unit (AHU) data from one or more data sources; determine one or more VAVs as a suspect VAV based on at least one of the VAV data or the AHU data; and remove the suspect VAV from a calculation of a duct static pressure setpoint for an AHU.

In some embodiments, the suspect VAV includes one or more of a rogue VAV, an undersized VAV, or an oversized VAV.

In some embodiments, the instructions further cause the one or more processors to tag the suspect VAV with one or more of a mechanical failure, a faulty flow station, or an overridden damper.

In some embodiments, the instructions further cause the one or more processors to employ a machine learning model for tagging the suspect VAV.

In some embodiments, the AHU data includes one or more of a supply fan status (SF-S), a duct static pressure (DPT), or a duct static pressure setpoint (DPT-SP), and the VAV data includes one or more of a discharge air velocity pressure (DA-VP), a supply air flow (SA-F), a supply air flow setpoint (SAF-SP), a damper output (DPR-O), a zone temperature (ZN-T), or a zone temperature setpoint (ZNT-SP).

In some embodiments, the suspect VAV is tagged as a rogue VAV if the AHU is on, the VAV damper position is set to a maximum, and a percentage error between the DPT and the DPT-SP is less than a first predetermined percentage.

In some embodiments, the suspect VAV is further tagged as having a loose damper or mechanical failure if the DPR-O is greater than a second predetermined percentage and the SA-F is less than SAF-SP. The suspect VAV is further tagged as a faulty flow station connected to the suspect VAV if the DAVP has a flat line or unreliable, and the suspect VAV is further tagged as having an overridden damper if the DPR is greater than Z, and the SA-F is greater than the SAF-SP.

In some embodiments, the suspect VAV is tagged as oversized if the AHU is on, a percentage difference between the ZN-T and the ZNT-SP is less than a third predetermined percentage, a difference between SA-F and SAF-SP is less than a fourth predetermined percentage, and a supply air flow setpoint is at a minimum limit.

In some embodiments, the suspect VAV is further tagged as having an overridden damper if a percentage error between an average DPR-O for 2 or more consecutive operation periods is zero.

In some embodiments, the suspect VAV is tagged as undersized if the AHU is on, the ZN-T is greater than the ZNT-SP, VAV damper output is less than 100 percent, a difference between the SA-F and the SAF-SP is within Y percent, and the SAF-SP is at a maximum limit.

In some embodiments, the instructions further cause the one or more processors to cluster at least one of the one or more VAVs together. Each of the at least one VAV includes a rogue VAV, an oversized VAV, or an undersized VAV.

Another aspect is a method of monitoring and controlling building equipment, the method including: receiving one or more of variable air volume unit (VAV) data or air handling unit (AHU) data from one or more data sources; determining one or more VAVs as a suspect VAV based on at least one of the VAV data or the AHU data; and removing the suspect VAV from a calculation of a duct static pressure setpoint for an AHU.

In some embodiments, the determining the one or more VAVs as the suspect VAV includes tagging the one or more VAVs as: a rogue VAV with one or more of having a mechanical failure, a faulty flow station, or an overridden damper; an undersized VAV with one or more of having an overridden damper or having flow limits that require verification; and an oversized VAV with one or more of having an overridden damper or having flow limits that require verification.

In some embodiments, the AHU data includes one or more of a supply fan status (SF-S), a duct static pressure (DPT), or a duct static pressure setpoint (DPT-SP), and the VAV data includes one or more of a discharge air velocity pressure (DA-VP), a supply air flow (SA-F), a supply air flow setpoint (SAF-SP), a damper output (DPR-O), a zone temperature (ZN-T), or a zone temperature setpoint (ZNT-SP).

In some embodiments, the suspect VAV is further tagged as: the rogue VAV if the AHU is on, the VAV damper position is set to a maximum, and a percentage error between the DPT and the DPT-SP is less than a first predetermined percentage; having a loose damper or mechanical failure if the DPR-O is greater than a second predetermined percentage and the SA-F is less than SAF-SP, a faulty flow station connected to the suspect VAV if the DAVP has a flat line or unreliable, and as having an overridden damper if the DPR is greater than Z, and the SA-F is greater than the SAF-SP.

In some embodiments, the suspect VAV is further tagged as: oversized if the AHU is on, a percentage difference between the ZN-T and the ZNT-SP is less than a third predetermined percentage, a difference between SA-F and SAF-SP is less than a fourth predetermined percentage, and a supply air flow setpoint is at a minimum limit; and having an overridden damper if a percentage error between an average DPR-O for 2 or more consecutive operation periods is zero.

In some embodiments, the suspect VAV is further tagged as undersized if the AHU is on, the ZN-T is greater than the ZNT-SP, VAV damper output is less than 100 percent, a difference between the SA-F and the SAF-SP is within Y percent, and the SAF-SP is at a maximum limit.

In some embodiments, the determining the one or more VAVs as a suspect VAV includes employing a machine learning model.

Another aspect is a building management system including: one or more variable air volume units (VAVs) configured to provide air flow into a building; an air handling unit (AHU) configured to provide the air flow to the one or more VAVs; and one or more memory devices configured to store instructions thereon that, when executed by one or more processors, cause the one or more processors to: receive VAV data from the one or more of VAVs or AHU data from the AHU; determine one or more VAVs as a suspect VAV based on at least one of the VAV data or the AHU data; and remove the suspect VAV from a calculation of a duct static pressure setpoint for the AHU.

In some embodiments, the server employs a machine learning model for tagging the suspect VAV.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8 depicts the list of AHUs and count of affiliated VAVs clustered as rogue, undersized and oversized.

DETAILED DESCRIPTION

Overview

Typically, manual techniques for identification of rogue (or problematic or suspect) VAV are employed. However, none of the conventional techniques automatically identify one or more rogue VAVs, undersized VAVs and oversized VAVs. Additionally, conventional techniques do not automatically exclude rogue VAVs from AHU discharge air pressure reset control-strategy at a controller/cloud level. The present disclosure envisages a system for automatic detection and clustering of VAVs that is cost effective and less time consuming than the conventional techniques that require manual implementation at the controller level which are very time consuming and lead to huge manual efforts due to the controller's memory and processing limitations.

The technical advantages of the present disclosure include, but are not limited to: reduction in the kilowatt-hour (kWh) wastage, e.g., total amount of electricity wasted, reduction in controller/hardware level dependencies, elimination of the need for an upgrade of existing hardware, elimination of dependency on vendor specific controller commissioning agents, reduction in labor cost for programming, configuring, and commissioning of existing controllers, and enhancement in occupant comfort through identification and clustering of rogue, oversize, and undersize VAVs and subsequent elimination of rogue VAVs from duct static pressure setpoint.

Building HVAC System

Figure 1:
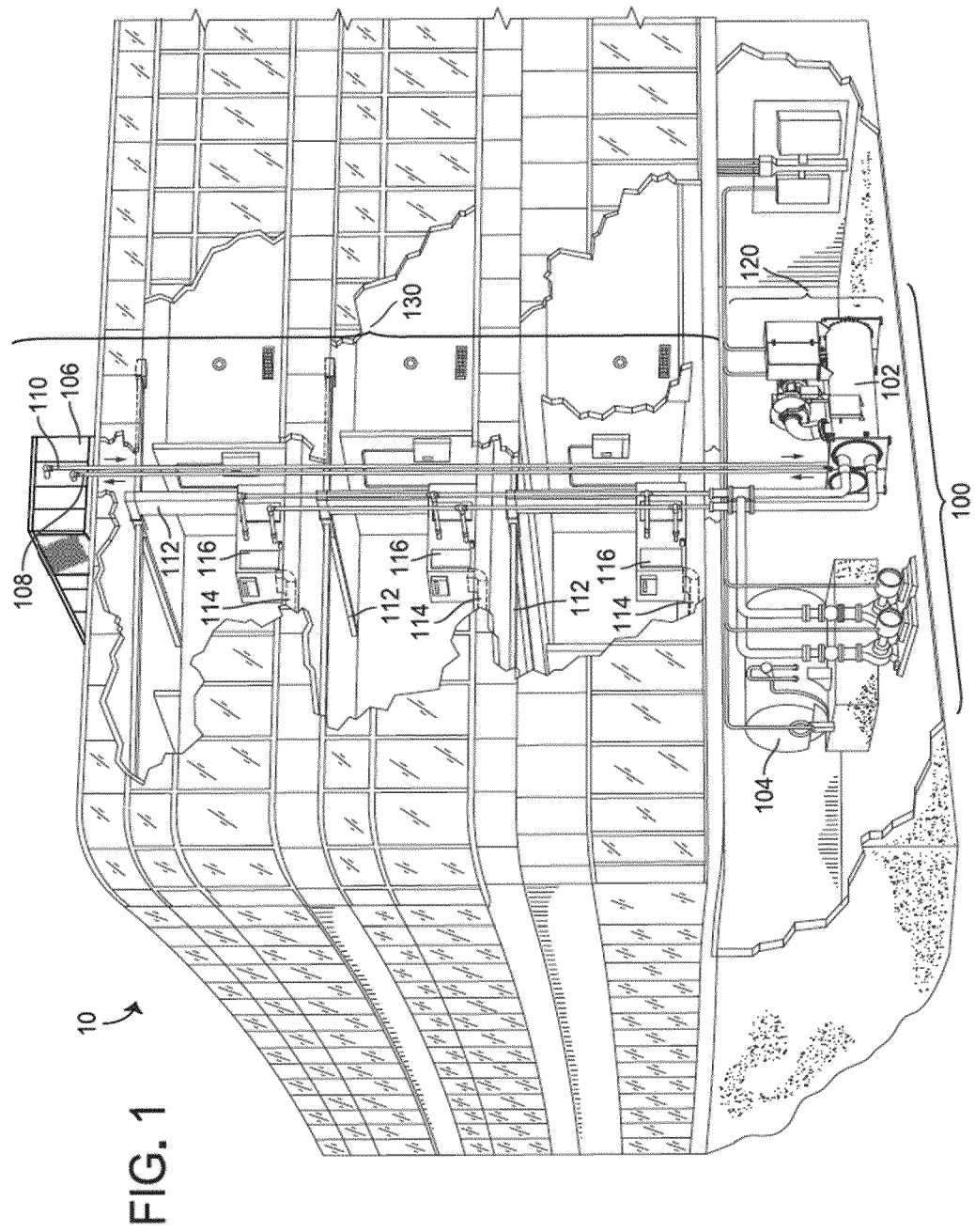
FIG. 1 is a perspective view of a building including a HVAC system, according to some embodiments.

Referring now to FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, air conditioning, ventilation, and/or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop AHU 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.) that serves one or more buildings including building 10. The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple VAVs 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Airside System

Figure 2:
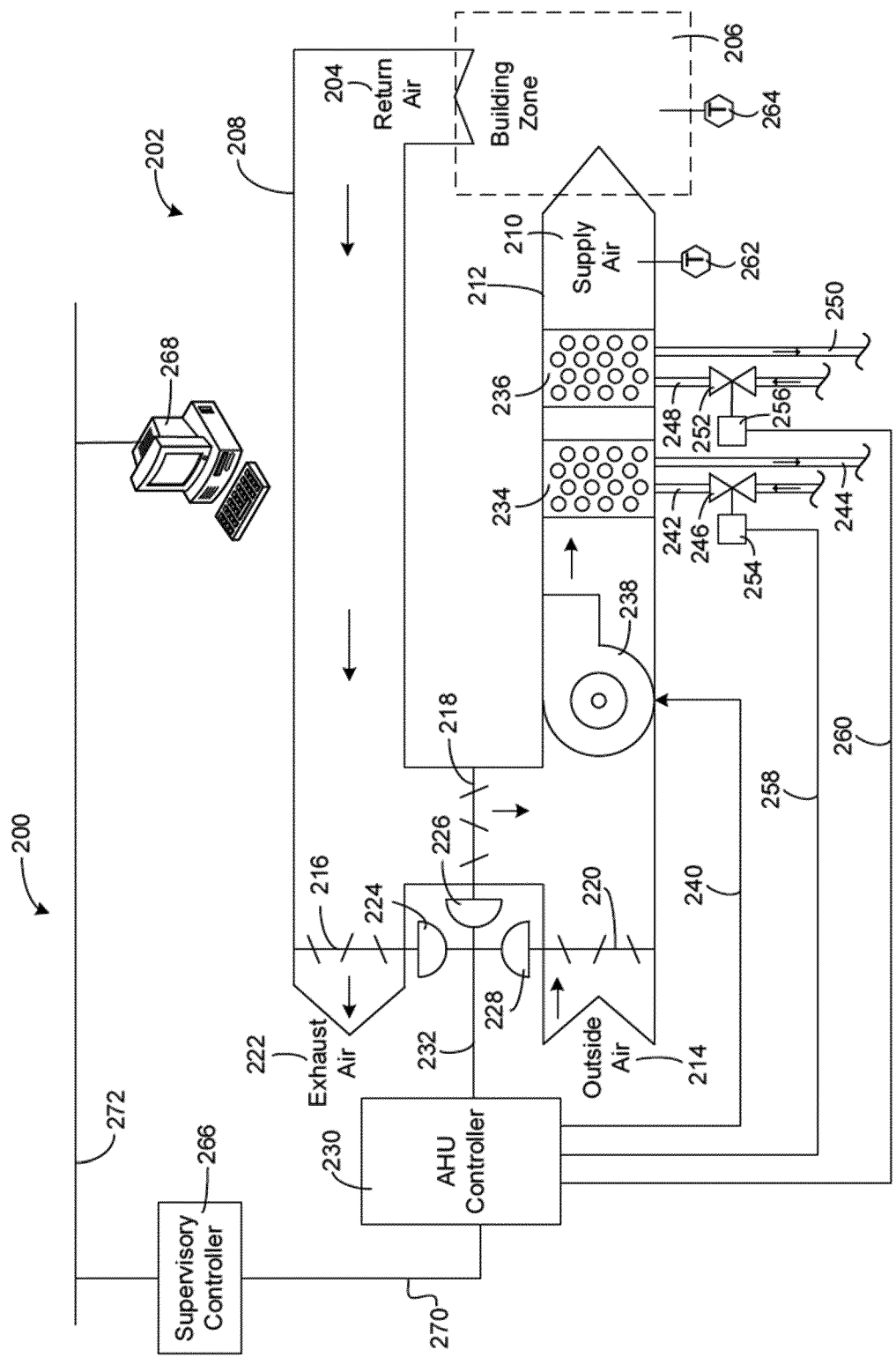
FIG. 2 is a block diagram of an airside system including an AHU which can be used in the HVAC system of FIG. 1, according to some embodiments.

Referring now to FIG. 2, a block diagram of an airside system 200 is shown, according to some embodiments. In various embodiments, airside system 200 may supplement or replace airside system 130 in HVAC system 100 or can be implemented separate from HVAC system 100. When implemented in HVAC system 100, airside system 200 can include a subset of the HVAC devices in HVAC system 100 (e.g., AHU 106, VAV units 116, ducts 112-114, fans, dampers, etc.) and can be located in or around building 10. Airside system 200 may operate to heat or cool an airflow provided to building 10 using a heated or chilled fluid provided by waterside system 120.

In FIG. 2, airside system 200 is shown to include an economizer-type AHU 202. Economizer-type AHUs vary the amount of outside air and return air used by the air handling unit for heating or cooling. For example, AHU 202 may receive return air 204 from building zone 206 via return air duct 208 and may deliver supply air 210 to building zone 206 via supply air duct 212. In some embodiments, AHU 202 is a rooftop unit located on the roof of building 10 (e.g., AHU 106 as shown in FIG. 1) or otherwise positioned to receive both return air 204 and outside air 214. AHU 202 can be configured to operate exhaust air damper 216, mixing damper 218, and outside air damper 220 to control an amount of outside air 214 and return air 204 that combine to form supply air 210. Any return air 204 that does not pass through mixing damper 218 can be exhausted from AHU 202 through exhaust damper 216 as exhaust air 222.

Each of dampers 216-220 can be operated by an actuator. For example, exhaust air damper 216 can be operated by actuator 224, mixing damper 218 can be operated by actuator 226, and outside air damper 220 can be operated by actuator 228. Actuators 224-228 may communicate with an AHU controller 230 via a communications link 232. Actuators 224-228 may receive control signals from AHU controller 230 and may provide feedback signals to AHU controller 230. Feedback signals can include, for example, an indication of a current actuator or damper position, an amount of torque or force exerted by the actuator, diagnostic information (e.g., results of diagnostic tests performed by actuators 224-228), status information, commissioning information, configuration settings, calibration data, and/or other types of information or data that can be collected, stored, or used by actuators 224-228. AHU controller 230 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 224-228.

Still referring to FIG. 2, AHU 202 is shown to include a cooling coil 234, a heating coil 236, and a fan 238 positioned within supply air duct 212. Fan 238 can be configured to force supply air 210 through cooling coil 234 and/or heating coil 236 and provide supply air 210 to building zone 206. AHU controller 230 may communicate with fan 238 via communications link 240 to control a flow rate of supply air 210. In some embodiments, AHU controller 230 controls an amount of heating or cooling applied to supply air 210 by modulating a speed of fan 238.

Cooling coil 234 may receive a chilled fluid from waterside system 120 (via piping 242 and may return the chilled fluid to waterside system 120 via piping 244. Valve 246 can be positioned along piping 242 or piping 244 to control a flow rate of the chilled fluid through cooling coil 234. In some embodiments, cooling coil 234 includes multiple stages of cooling coils that can be independently activated and deactivated (e.g., by AHU controller 230, by supervisory controller 266, etc.) to modulate an amount of cooling applied to supply air 210.

Heating coil 236 may receive a heated fluid from waterside system 120 via piping 248 and may return the heated fluid to waterside system 120 via piping 250. Valve 252 can be positioned along piping 248 or piping 250 to control a flow rate of the heated fluid through heating coil 236. In some embodiments, heating coil 236 includes multiple stages of heating coils that can be independently activated and deactivated (e.g., by AHU controller 230, by supervisory controller 266, etc.) to modulate an amount of heating applied to supply air 210.

Each of valves 246 and 252 can be controlled by an actuator. For example, valve 246 can be controlled by actuator 254 and valve 252 can be controlled by actuator 256. Actuators 254-256 may communicate with AHU controller 230 via communications links 258-260. Actuators 254-256 may receive control signals from AHU controller 230 and may provide feedback signals to controller 230. In some embodiments, AHU controller 230 receives a measurement of the supply air temperature from a temperature sensor 262 positioned in supply air duct 212 (e.g., downstream of cooling coil 234 and/or heating coil 236). AHU controller 230 may also receive a measurement of the temperature of building zone 206 from a temperature sensor 264 located in building zone 206.

In some embodiments, AHU controller 230 operates valves 246 and 252 via actuators 254-256 to modulate an amount of heating or cooling provided to supply air 210 (e.g., to achieve a setpoint temperature for supply air 210 or to maintain the temperature of supply air 210 within a setpoint temperature range). The positions of valves 246 and 252 affect the amount of heating or cooling provided to supply air 210 by cooling coil 234 or heating coil 236 and may correlate with the amount of energy consumed to achieve a desired supply air temperature. AHU controller 230 may control the temperature of supply air 210 and/or building zone 206 by activating or deactivating coils 234-236, adjusting a speed of fan 238, or a combination of both.

Still referring to FIG. 2, airside system 200 is shown to include a supervisory controller 266 and a client device 268. Supervisory controller 266 can include one or more computer systems (e.g., servers, supervisory controllers, subsystem controllers, etc.) that serve as system level controllers, application or data servers, head nodes, or master controllers for airside system 200, waterside system 120, HVAC system 100, and/or other controllable systems that serve building 10. Supervisory controller 266 may communicate with multiple downstream building systems or subsystems (e.g., HVAC system 100, a security system, a lighting system, waterside system 120, etc.) via a communications link 270 according to like or disparate protocols (e.g., LON, BACnet, etc.). In various embodiments, AHU controller 230 and supervisory controller 266 can be separate (as shown in FIG. 2) or integrated. In an integrated implementation, AHU controller 230 can be a software module configured for execution by a processor of supervisory controller 266.

In some embodiments, AHU controller 230 receives information from supervisory controller 266 (e.g., commands, setpoints, operating boundaries, etc.) and provides information to supervisory controller 266 (e.g., temperature measurements, valve or actuator positions, operating statuses, diagnostics, etc.). For example, AHU controller 230 may provide supervisory controller 266 with temperature measurements from temperature sensors 262-264, equipment on/off states, equipment operating capacities, and/or any other information that can be used by supervisory controller 266 to monitor or control a variable state or condition within building zone 206.

Client device 268 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 268 can be a computer workstation, a client terminal, a remote or local interface, or any other type of user interface device. Client device 268 can be a stationary terminal or a mobile device. For example, client device 268 can be a desktop computer, a computer server with a user interface, a laptop computer, a tablet, a smartphone, a PDA, or any other type of mobile or non-mobile device. Client device 268 may communicate with supervisory controller 266 and/or AHU controller 230 via communications link 272.

AHU Controller

Figure 3:
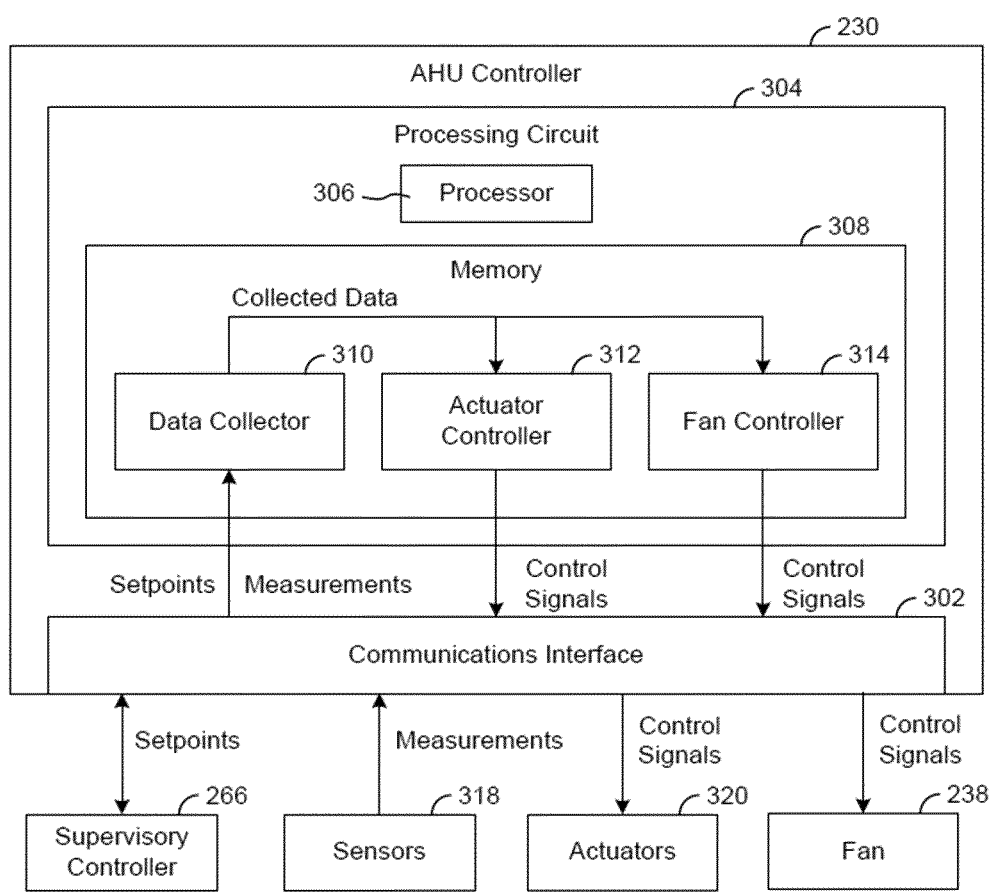
FIG. 3 is a block diagram of an AHU controller which can be used to monitor and control the AHU of FIG. 2, according to some embodiments.

Referring now to FIG. 3, a block diagram illustrating AHU controller 230 in greater detail is shown, according to an exemplary embodiment. AHU controller 230 may be configured to monitor and control various components of AHU 202 using any of a variety of control techniques (e.g., state-based control, on/off control, proportional control, proportional-integral (PI) control, proportional-integral-derivative (PID) control, extremum seeking control (ESC), model predictive control (MPC), etc.). AHU controller 230 may receive setpoints from supervisory controller 266 and measurements from sensors 318 and may provide control signals to actuators 320 and fan 238.

Sensors 318 may include any of the sensors shown in FIG. 2 or any other sensor configured to monitor any of a variety of variables used by AHU controller 230. Variables monitored by sensors 318 may include, for example, zone air temperature, zone air humidity, zone occupancy, zone $CO_2$ levels, zone particulate matter (PM) levels, outdoor air temperature, outdoor air humidity, outdoor air $CO_2$ levels, outdoor air PM levels, damper positions, valve positions, fan status, supply air temperature, supply air flowrate, or any other variable of interest to AHU controller 230.

Actuators 320 may include any of the actuators shown in FIG. 2 or any other actuator controllable by AHU controller 230. For example, actuators 320 may include actuator 224 configured to operate exhaust air damper 216, actuator 226 configured to operate mixing damper 218, actuator 228 configured to outside air damper 220, actuator 254 configured to operate valve 246, and actuator 256 configured to operate valve 252. Actuators 320 may receive control signals from AHU controller 230 and may provide feedback signals to AHU controller 230.

AHU controller 230 may control AHU 202 by controllably changing and outputting a control signals provided to actuators 320 and fan 238. In some embodiments, the control signals include commands for actuators 320 to set dampers 216-220 and/or valves 246 and 252 to specific positions to achieve a target value for a variable of interest (e.g., supply air temperature, supply air humidity, flow rate, etc.). In some embodiments, the control signals include commands for fan 238 to operate a specific operating speed or to achieve a specific airflow rate. The control signals may be provided to actuators 320 and fan 238 via communications interface 302. AHU 202 may use the control signals an input to adjust the positions of dampers 216-220 control the relative proportions of outside air 214 and return air 204 provided to building zone 206.

AHU controller 230 may receive various inputs via communications interface 302. Inputs received by AHU controller 230 may include setpoints from supervisory controller 266, measurements from sensors 318, a measured or observed position of dampers 216-220 or valves 246 and 252, a measured or calculated amount of power consumption, an observed fan speed, temperature, humidity, air quality, or any other variable that can be measured or calculated in or around building 10.

AHU controller 230 includes logic that adjusts the control signals to achieve a target outcome. In some operating modes, the control logic implemented by AHU controller 230 utilizes feedback of an output variable. The logic implemented by AHU controller 230 may also or alternatively vary a manipulated variable based on a received input signal (e.g., a setpoint). Such a setpoint may be received from a user control (e.g., a thermostat), a supervisory controller (e.g., supervisory controller 266), or another upstream device via a communications network (e.g., a BACnet network, a LonWorks network, a LAN, a WAN, the Internet, a cellular network, etc.).

Still referring to FIG. 3, AHU controller 230 is shown to include a communications interface 302. Communications interface 302 can be or include wired or wireless communications interfaces (e.g., jacks, antennas, transmitters, receivers, transceivers, wire terminals, etc.) for conducting data communications with various components of AHU 202 or other external systems or devices. In various embodiments, communications via communications interface 302 can be direct (e.g., local wired or wireless communications) or via a communications network (e.g., a WAN, the Internet, a cellular network, etc.). For example, communications interface 302 can include an Ethernet card and port for sending and receiving data via an Ethernet-based communications link or network. In another example, communications interface 302 can include a Wi-Fi transceiver for communicating via a wireless communications network. In another example, communications interface 302 can include a cellular or mobile phone transceiver, a power line communications interface, an Ethernet interface, or any other type of communications interface.

Still referring to FIG. 3, AHU controller 230 is shown to include a processing circuit 304 having a processor 306 and memory 308. Processor 306 may be a general purpose or specific purpose processor, an application specific integrated circuit (ASIC), one or more field programmable gate arrays (FPGAs), a group of processing components, or other suitable processing components. Processor 306 is configured to execute computer code or instructions stored in memory 308 or received from other computer readable media (e.g., CDROM, network storage, a remote server, etc.).

Memory 308 may include one or more devices (e.g., memory units, memory devices, storage devices, etc.) for storing data and/or computer code for completing and/or facilitating the various processes described in the present disclosure. Memory 308 may include random access memory (RAM), read-only memory (ROM), hard drive storage, temporary storage, non-volatile memory, flash memory, optical memory, or any other suitable memory for storing software objects and/or computer instructions. Memory 308 may include database components, object code components, script components, or any other type of information structure for supporting the various activities and information structures described in the present disclosure. Memory 308 may be communicably connected to processor 306 via processing circuit 304 and may include computer code for executing (e.g., by processor 306) one or more processes described herein.

Memory 308 can include any of a variety of functional components (e.g., stored instructions or programs) that provide AHU controller 230 with the ability to monitor and control AHU 202. For example, memory 308 is shown to include a data collector 310 which operates to collect the data received via communications interface 302 (e.g., setpoints, measurements, feedback from actuators 320 and fan 238, etc.). Data collector 310 may provide the collected data to actuator controller 312 and fan controller 314 which use the collected data to generate control signals for actuators 320 and fan 238, respectively. The particular type of control methodology used by actuator controller 312 and fan controller 314 (e.g., state-based control, PI control, PID control, ESC, MPC, etc.) may vary depending on the configuration of AHU controller and can be adapted for various implementations.

System for Automatic Detection and Clustering of Variable Air Volume Units

Figure 4:
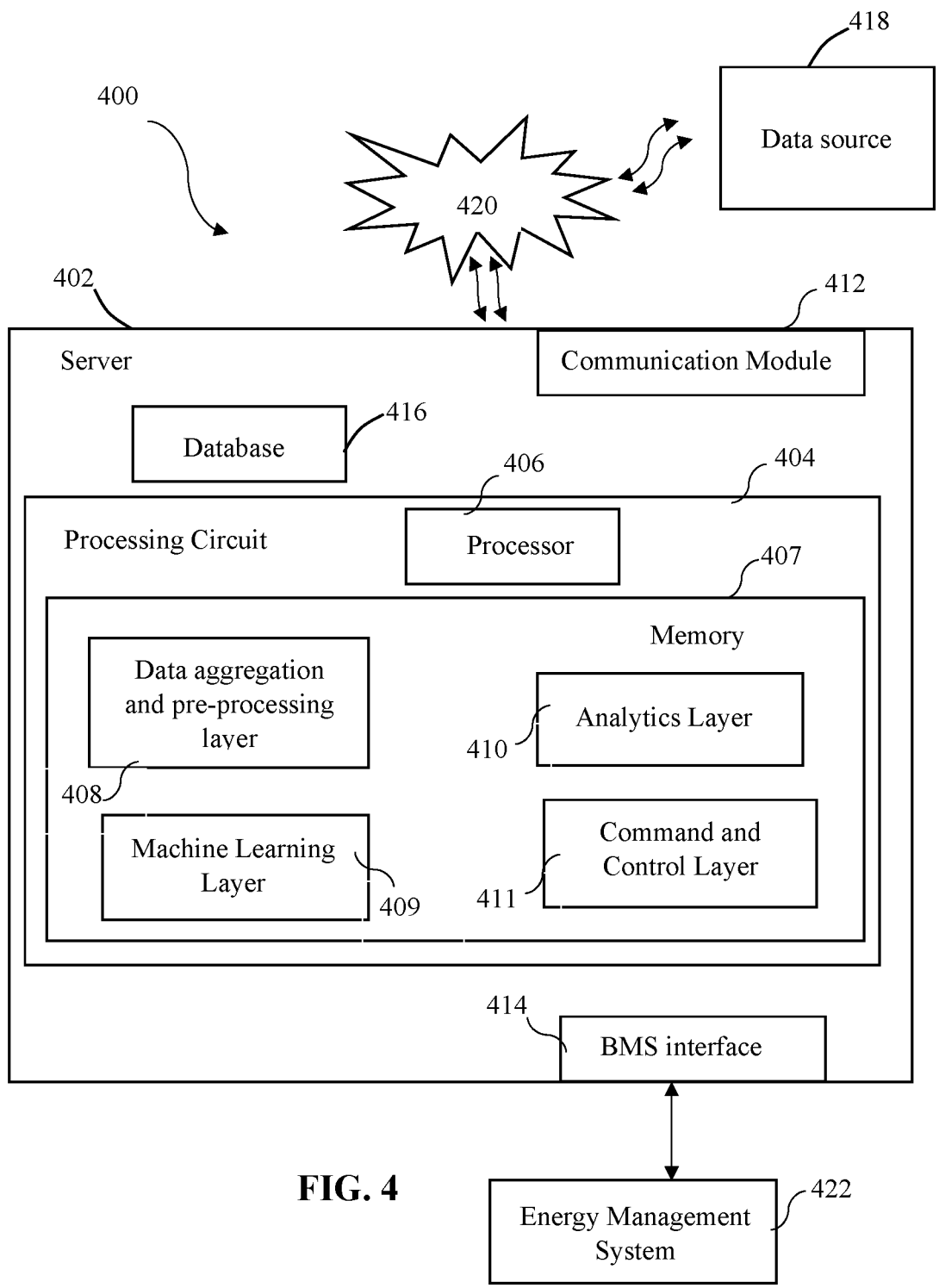
FIG. 4 is a block diagram of a system for automatic detection and clustering of variable air volume units, according to some embodiments.

FIG. 4 is a block diagram of a system 400 that automatically detects rogue VAVs, undersized VAVs, and oversized VAVs and clusters them accordingly. In some embodiments, the VAV units 116 (e.g., as shown in FIGS. 1 and 2) can include dampers or other flow control elements to control the amount of airflow that is supplied to individual zones of a building 10 (shown in FIG. 1).

The system 400 of the present disclosure includes a server 402 and one or more data sources 418. In some embodiments, the server 402 can be one of a remote server, a cloud server, or an on-premise server. The server 402 is communicatively coupled with the data source 418 to receive VAV data (also referred as first data) and AHU data (also referred as second data). In an embodiment, the VAV data can include information of one or more sites or zones. Similarly, the AHU data can include information of one or more AHUs affiliated with the building 10.

The data source 418 can be one of a BMS supervisory controller 266 (shown in FIG. 2), a field controller, or any processor or microcontroller enabled upstream device of the BMS that is capable of transmitting the AHU data and the VAV data via a communication network 420. For example, the communication network 420 can be a BACnet network, a LonWorks network, a LAN, a WAN, the Internet, a cellular network, and the like. In some embodiments, the data source 418 may include remote controllers affiliated with one or more remote building management systems or automation systems.

In some embodiments, the server 402 includes a processing circuit 404, a database 416, a communication module 412, and a BMS interface 414.

The communication module 412 may facilitate communication between the server 402 and the one or more data sources 418. The BMS interface 414 may facilitate communication between the server 402 and an energy management system 422 of the BMS. In some embodiments, the BMS interface 414 may also provide communication between the server 402 and one or more client devices (not shown in figures).

The communication module 412 and the BMS interface 414 can be or include wired or wireless communications interfaces (e.g., jacks, antennas, transmitters, receivers, transceivers, wire terminals, etc.) for conducting data communications. In various embodiments, communications via the communication module 412 and the BMS interface 414 can be direct (e.g., local wired or wireless communications) or via the communication network 420 (e.g., a WAN, the Internet, a cellular network, etc.). For example, the communication module 412 and the BMS interface 414 can include an Ethernet card and port for sending and receiving data via an Ethernet-based communications link or network. In another example, the communication module 412 and the BMS interface 414 can include a Wi-Fi transceiver for communicating via a wireless communications network. In another example, one or both of the communication module 412 and the BMS interface 414 can include cellular or mobile phone communications transceivers. In some embodiments, the communication module 412 is a power line communications interface and the BMS interface 414 is an Ethernet interface. In other embodiments, both the communication module 412 and the BMS interface 414 are Ethernet interfaces or are the same Ethernet interface.

Still referring to FIG. 4, the processing circuit 404 includes a processor 406 and a memory 407. The processing circuit 404 can be communicably connected to the BMS interface 414 and/or the communication module 412 such that processing circuit 134 and the various components thereof can send and receive data via the BMS interface 414 and the communication module 412. The processor 406 can be implemented as a general purpose processor, an application specific integrated circuit (ASIC), one or more field programmable gate arrays (FPGAs), a group of processing components, or other suitable electronic processing components.

The memory 407 (e.g., memory, memory unit, storage device, etc.) can include one or more devices (e.g., RAM, ROM, Flash memory, hard disk storage, etc.) for storing data and/or computer code for completing or facilitating the various processes, layers, and modules described in the present application. The memory 407 can be or include volatile memory or non-volatile memory. The memory 407 can include database components, object code components, script components, or any other type of information structure for supporting the various activities and information structures described in the present application. According to some embodiments, the memory 407 is communicably connected to processor 406 via the processing circuit 404 and includes computer code for executing (e.g., by the processing circuit 404 and/or the processor 406) one or more processes described herein.

In some embodiments, the server 402 can be implemented using a single computer (e.g., one housing, a packaged unit, etc.). In other embodiments, the server 402 can be implemented across multiple devices or computers (e.g., that can exist in distributed locations).

The database 416 is enabled to store the VAV data and the AHU data received from the data sources 418 over the network 420 via the communication module 412. The database 416 may be enabled to periodically receive and store the VAV data and the AHU data as a historical data or a training data. In some embodiments, the AHU data includes, but is not limited to, a supply fan status (SF-S), a duct static pressure (DPT), and a duct static pressure setpoint (DPT-SP). In some embodiments, the VAV data includes, but is not limited to, a discharge air velocity pressure (DA-VP), a supply air flow (SA-F), a supply air flow setpoint (SAF-SP), a damper output (DPR-O), a zone temperature (ZN-T), and a zone temperature setpoint (ZNT-SP). Although, the database 416 is shown integral to the server 402, the database 416 in some embodiments can be a separate cloud storage.

Still referring to FIG. 4, the memory 407 is shown to include a data aggregation and pre-processing layer 408, a machine learning layer 409, an analytics layer 410, and a command and control layer 411. Layers 408-411 can be configured to receive the VAV data affiliated with one or more VAVs; and the AHU data affiliated with one or more AHUs, from the one or more data sources 418 to cluster VAVs into rogue VAVs, oversized VAVs, and undersized VAV. In some embodiments, layers 408-411 are enabled to receive the VAV data and the AHU data periodically at pre-defined time intervals. The pre-defined time intervals can be user defined or system defined. For an example, pre-defined time interval can be once in a month. The following paragraphs describe some of the functions performed by each layers 408-411.

The data aggregation and pre-processing layer 408 can be configured to receive the VAV data and the AHU data from the database 416 as the training data. The data aggregation and pre-processing layer 408 is enabled to aggregate the VAV data and the AHU data, and subsequently pre-process the training data to handle undesired value(s).

The machine learning layer 409 is enabled to receive the training data, e.g., the VAV data and the AHU data, from the data aggregation and preprocessing layer 408. The machine learning layer 409 is configured to train, validate, and apply machine learning model to detect rogue VAVs, undersized VAVs, and oversized VAVs and cluster them accordingly. Additionally, the machine learning layer 409 tags (or labels) each of the clustered VAVs. In some embodiments, the tags (or labels) can specify the category of VAVs within rogue, oversized, and undersized VAVs.

Figure 5:
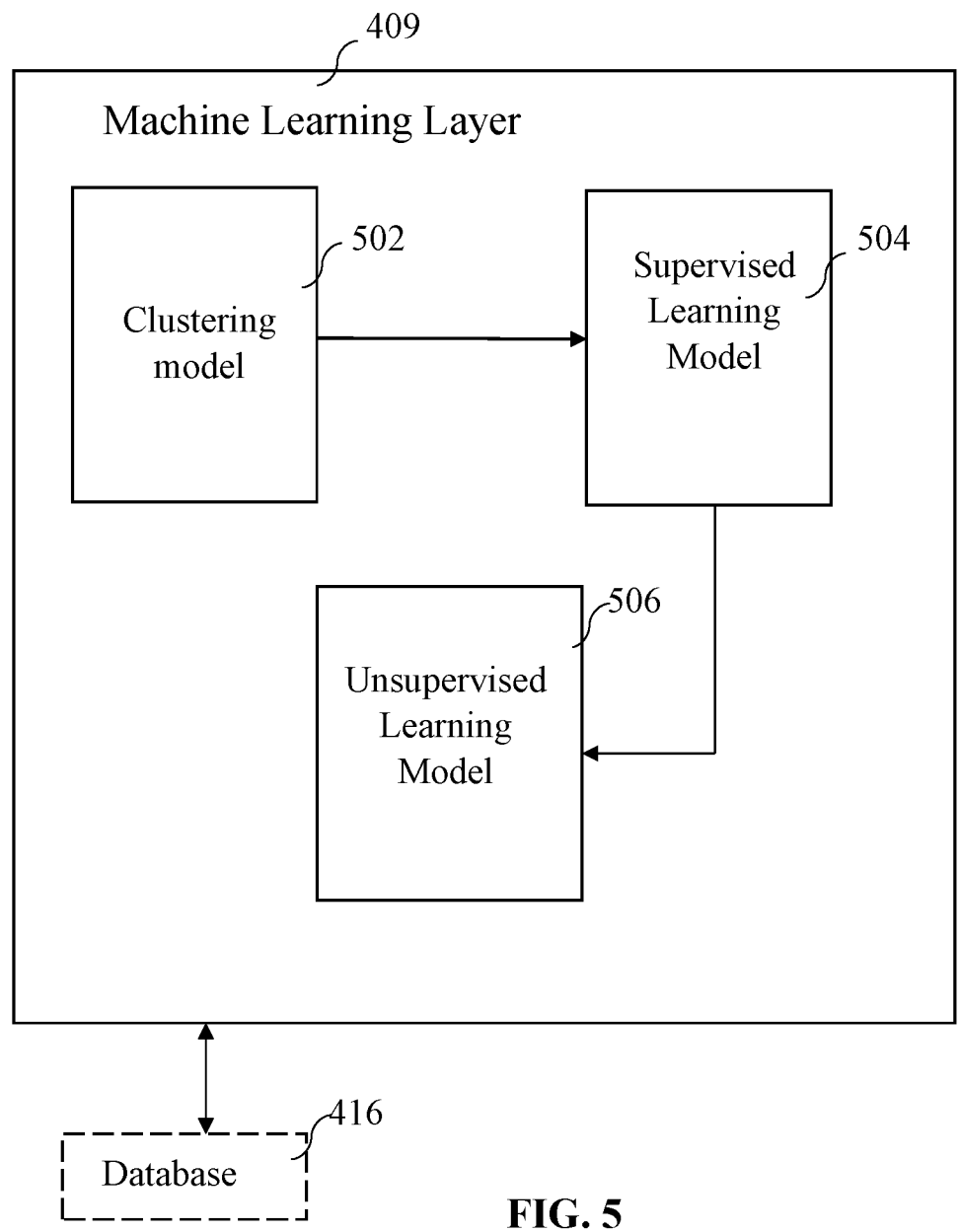
FIG. 5 is a block diagram of a machine learning layer of the system of FIG. 4, according to some embodiments.

Referring to FIG. 5, the machine learning layer 409 includes a clustering model 502, a supervised learning model 504, and an unsupervised learning model 506. In some embodiments, the machine learning layer 409 may include one of supervised learning model 504 or unsupervised learning model 506.

The clustering model 502 may perform an equation driven detection of rogue, undersized, and oversized VAVs for clustering. In some embodiments, the clustering of VAVs can be performed as a preparatory step for training the supervised learning layer 504 and the unsupervised learning layer 506 of the machine learning layer 409. Additionally, the clustering model 502 is enabled to tag the VAVs that are clustered.

The clustering model 502 can be configured to receive AHU data and VAV data. Hereinafter, AHU data may be referred to as AHU point templates data and VAV data may be referred to as VAV point templates data. In some embodiments, the clustering model 502 can determine the VAV unit as the rogue VAV when ((AHU Status is ON) and (VAV Damper Position is at 100 percent) and (absolute percentage error between DPT & DPT-SP<2 percent)). Further, the clustering model 502 can tag the rogue VAV as damper loose or mechanical failure when ((DPR-O>99 percent) and (SA-F<SAF-SP)). Still further, when DA-VP has a flat line or is unreliable then the clustering model 502 tags the rogue VAV as flow station faulty (e.g., the flow station that measures the air velocity pressure is faulty). Still further, when ((DPR>99) and (SA-F>SAF-SP)) then the clustering model 502 can tag the rogue VAV as damper overridden.

In some embodiments, the logic for identifying rogue VAVs and subsequently tagging them may be expressed as follows:

---

If (AHU Status is ON)) and (VAV Damper Position = 100 (or maximum)) and
(absolute percentage error between DPT & DPT-SP < 2 percent):
  Rogue
    if (DPR-O > 99 percent) and (SA-F < SAF-SP): Damper loose or
  mechanical failure
    else if DA-VP flatline or unreliable: Flow Station faulty
    else if (DPR > 99) and (SA-F > SAF-SP): Damper overridden
Else
  NOT Rogue

---

Further, the clustering model 502 can determine the VAV unit as an oversized VAV unit if ((AHU Status is ON) and (absolute percentage error between ZN-T & ZNT-SP<10 percent) and (DPR-O<100 percent) and (absolute percentage error between SA-F & SAF-SP<10 percent) and (supply air flow setpoint is at minimum limit)). Further, when the percentage of error between the average DPR-O for two consecutive operation period is equal to zero, then the clustering model 502 can tag the oversized VAV unit as damper overridden. Still further, if the percentage of error between average DPR-O for two consecutive operation period is not equal to zero then the clustering model 502 tags the oversized VAV unit as verify flow limits.

In some embodiments, the logic for identifying oversized VAVs and subsequently tagging them may be expressed as follows:

```
If ((AHU Status is ON)) and (absolute percentage error between ZN-T & ZNT-SP
< 10 percent) and (DPR-O < 100 percent) and (absolute percentage error between
SA-F & SAF-SP < 10 percent) and (supply air flow set point is at minimum limit))
    Oversized
        if (percentage error between average DPR-O for 2 consecutive
        operation period) == 0: Damper overridden;
        else if (percentage error between average DPR-O for 2 consecutive
        operation period) != 0: Please adjust/verify flow limits
Else not oversized
```

Further, the clustering model 502 can determine the VAV unit as undersized VAV when ((AHU Status is ON) and (Zone Temperature (+difference of 2 degrees Celsius)>Zone Temperature Setpoint) and (VAV damper output<100 percent) and (Supply Air Flow−Supply Air Flow Setpoint=(+−10 percent)) and (supply air flow set point is at maximum limit)). Additionally, when the percentage of error between average DPR-O for two consecutive operation period is equal to zero, then the clustering model 502 can tag the undersized VAV unit as damper overridden. Still further, if the percentage of error between average DPR-O for two consecutive operation period is not equal to zero, then the clustering model 502 can tag the undersized VAV unit as verify flow limits.

In some embodiments, the logic for identifying undersized VAVs and subsequently tagging them may be expressed as follows:

```
If ((AHU Status is ON)) and (Zone Temperature (+/− 2 degrees Celsius) > Zone
Temperature Setpoint) and (VAV damper output < 100 percent) and (Supply Air
Flow - Supply Air Flow Setpoint = (+/− 10 percent)) and (Supply Air Flow Setpoint
is at maximum limit))
    Undersized
        if (percentage error between average DPR-O for 2 consecutive operation
        period) == 0: Damper overridden;
        else if (percentage error between average DPR-O for 2 consecutive
        operation period) != 0: Please adjust/verify flow limits;
Else not undersized.
```

Still referring to FIG. 5, the supervised learning model 504 can be trained to identify the VAV point templates and/or a combination of VAV point templates that have the highest weight and are highly responsible for categorizing the VAV as one of rogue VAV, the oversized VAV, or the undersized VAV. The supervised learning model 504 is communicatively coupled with the clustering model 502 to receive VAV point templates data of one or more zones or sites along with cluster of rogue, undersized, and oversized VAVs.

The supervised learning model 504 is configured to receive a sample dataset containing VAV point templates from one or more sites and classification of rogue, oversized, and undersized VAVs from the clustering model 502. In some embodiments, the supervised learning model 504 may be configured to receive the sample dataset from the clustering model 502.

In some embodiments, the sample dataset is divided into three parts, e.g., sixty percent can be utilized for training the supervised learning model 504, twenty percent can be utilized for validation, and the remaining twenty percent can be utilized for testing. In some embodiments, the aforementioned percentages can be varied.

Further, the supervised learning model 504 can employ a support vector machine algorithm, where each record, e.g., VAV data, can be mapped as a point in an n-dimensional vector space. In some embodiments, 'n' represents the number of dimensions in matrix 'x', and each dimension represents a specific attribute contributing towards clustering of the VAV.

$x$=Vector of [VAV Point Templates from multiple sites], $x \in Rn$, $X$ is a matrix of $x^{(i)\wedge T}$ Further, '$l^k$' can be selected as a random point in the vector space, where "l" is a vector of three random points in the n-dimensional space and 'k' represents the possible clusters, e.g., rogue, oversized, or undersized.

$$f^{(k)} = -\exp\left(\frac{\|x - l^k\|}{2 \times \sigma^2}\right), \text{ where } F \text{ is a matrix of } f^{(k)^T}$$

Where, f(k) measures the similarity between each record and each $l^k$, and assigns that record to the nearest $l^k$.

In some embodiments, the process of randomly selecting $l^k$ and measuring similarity between $x^i$ with each $l^k$ and the assignment of the record with closest $l^k$ can be repeated until the cost function converges to a desired minimum threshold.

$$J_\Theta(X) = C \times \Sigma_{i=1}^m (y^{(i)} \times \text{cost}(\emptyset^T \times F^{(i)}) + (1-y^{(i)}) \times \text{cost}(\emptyset^T \times F^{(i)})) + 1/2 \Sigma_{j=1}^n \emptyset^2$$

Where, Ø=Matrix of learned parameters
cost ( )=Vector of Output for a training example.

Subsequently, cross validation with tagging can be performed to avoid a variance or bias problem. Based on the validation, accuracy of the supervised learning model 504 is determined, e.g., accuracy of the supervised learning model 504 can be determined upon successful validation. In some embodiments, accuracy of the supervised learning model 504 is percentage of correctly tagged clustered VAVs versus incorrectly tagged clustered VAVs.

In some embodiments, the aforementioned steps performed by the supervised learning model 504 may be repeated upon generation of unsatisfactory outcomes.

Still further, the weight of the highly contributing feature(s) of the VAV point template data or a polynomial combination of the VAV point template data can be determined and passed to the unsupervised learning model 506 as a metadata.

Still referring to FIG. 5, the unsupervised learning model 506 can be enabled to receive the VAV data and the metadata including the highly weighted features, e.g., VAV point template data or a polynomial combination of the VAV point template data. In some embodiments, the unsupervised learning model 506 employs k-means unsupervised learning. Further, the unsupervised learning model 506 can be enabled to consider the highly weighted feature, e.g., the most contributing parameter, and perform a dimensionality reduction from n dimensions to 2 dimension using vector projection method. Considering x=Vector of [most weighted features], m=Total size of the sample, and f=2, the unsupervised learning model 506 can be configured to perform data chunking, e.g., spiting data into training, validation, and test sets in proportion of 60 percent, 20 percent, and 20 percent respectively. However, embodiments are not limited thereto and the percentages may be higher or lower, depending on embodiments.

Still further, the unsupervised learning model 506 can be configured to:
  a. randomly select any 3 points from the vector X and mark them as centroids $\mu1,2,3$.
  b. Subsequently, each record can be assigned to the corresponding centroid using Euclidean distance method, where this step can be continued until convergence, e.g. until results similar to or better than that of supervised learning method is achieved.
    i. for all examples where i=1 to m:
      $c^{(i)}$:=index from 1 to 3 of cluster centroid closest to $x^{(i)}$
    ii. for all clusters where k=1 to 3:
      $\mu_k$:=mean of points assigned to cluster k
    iii. Update the cluster centroids.

Subsequently, cross validation with tagging can be performed to avoid variance or bias problem. Based on the validation, accuracy of the unsupervised learning model 506 can be determined. The accuracy of the unsupervised learning model 506 can be the percentage correctly tagged clustered VAVs versus incorrectly tagged clustered VAVs.

In some embodiment, the aforementioned steps performed by the unsupervised learning model 506 may be repeated upon generation of unsatisfactory outcomes.

In some embodiments, the clustering model 502, the supervised learning model 504, and the unsupervised learning models 506 can be recursively used to perform tagging within clusters of rogue, undersized and oversized VAVs.

The machine learning layer 409 can generate a list of clustered rogue VAVs, undersized VAVs, and oversized VAVs along with their respective tags. In some embodiments, the clustered rogue VAVs, undersized VAVs, and oversized VAVs along with their respective tags can be stored in the database 416.

In some embodiments, in order to tag the rogue VAVs, the clustering model 502 can receive the AHU point template data and the VAV point template data, and tag the rogue VAVs as the damper loose/mechanical failure, flow station faulty, or damper overridden. Further, the supervised learning model 504 can be trained based on the received VAV data and the tags from the clustering model 502 to determine highly contributing features towards the tagging of the rogue VAV. Still further, the unsupervised learning model 506 can be trained to tag the rogue VAV based on the highly contributing features derived by the supervised learning model 504.

In some embodiments, in order to tag the undersized VAVs, the clustering model 502 can receive the VAV point template data, and tag the undersized VAVs as one of damper overridden or flow limit issue. Further, the supervised learning model 504 can be trained based on the received VAV data and the tags from the clustering model 502 to determine the highly contributing features towards the tagging of the undersized VAV. The unsupervised learning model 506 can be trained to tag the undersized VAV based on the highly contributing features derived by the supervised learning model 504.

In some embodiments, in order to tag the oversized VAVs, the clustering model 502 can receive the VAV point template data, and tag the oversized VAVs as one of damper overridden or flow limit issue. Further, the supervised learning model 504 can be trained based on the received VAV data and the tags from the clustering model 502 to determine the highly contributing features towards tagging of the oversized VAV. The unsupervised learning model 506 can be trained to tag the oversized VAV based on the highly contributing features derived by the supervised learning model 504.

Referring to FIG. 4, the analytics layer 410 can be enabled to receive the list of clustered rogue VAVs, undersized VAVs, and oversized VAVs along with their respective tags from the machine learning layer 409. In some embodiments, the analytics layer 410 may be enabled to receive the list of clustered rogue VAVs, undersized VAVs, and oversized VAVs from the database 416. The analytics layer 410 can display a user friendly report depicting tags associated with each of the clustered VAVs. In some embodiments, the analytics layer 410 may be configured to group the rogue VAVs, the undersized VAVs, and the oversized VAVs associated with an AHU together.

For example, the analytics layer 410 can display the list of AHUs and a count of the rogue VAVs, a count of the undersized VAVs, and a count of the oversized VAVs associated with the AHU. In some embodiments, the analytics layer 410 can be enabled to calculate the count based on a pre-defined analytical programs. Further, the list of AHUs and the count of the associated rogue VAVs, undersized VAVs, and oversized VAVs are displayed on the client device(s) connected via the BMS interface 414, where hovering a pointer on the count of VAVs displays a device identifier of each of the clustered VAVs. Further, the selection of one of the identifiers can direct the user to a page providing additional details.

FIG. 8 depicts the list of AHUs and count of affiliated VAVs clustered as rogue, undersized and oversized.

In some embodiments, the processing circuit 404 can include a rogue VAV counter (not shown in figures) that is enabled to keep a count of the number of rogue VAVs identified by the machine learning layer 409. The command and control layer 411 can be configured to utilize the count of the number of rogue VAVs to optimize the duct static pressure setpoint (DPT-SP) for the associated AHU.

The command and control layer 411 can reduce the static pressure setpoint at a fixed rate, until a downstream zone is no longer satisfied and generates a request. When a sufficient number of requests are present, the command and control layer 411 can increase the static pressure setpoint. In some embodiments, each zone's request can be adjusted to ensure that critical zones are always satisfied. When a sufficient number of requests no longer exist, the static pressure setpoint is again can be decreased at a fixed rate.

In some embodiments, the command and control layer 411 can be enabled to poll the damper position of all VAVs. For example, all dampers may be below 60% per the information received from the one or more data sources 418 or damper position output of the VAV units. The command and control layer 411 can reset the duct static pressure setpoint (DPT-SP) of the AHU at a rate of −0.1" WC (water column). Further, if one or more VAV units damper position output is above 90 percent, the command and control layer 411 will reset the static pressure setpoint at a rate of +0.25" WC. In some embodiments, the command and control layer 411 is enabled to periodically poll damper position of all VAVs and limit reset frequency to once every fifteen minutes. However, this time period of reset frequency can be customized.

The rogue VAVs identified by the machine learning layer 409 can be excluded by the command and control layer 411 while determining the optimized duct static pressure setpoint (DPT-SP) for the corresponding AHU. Still further, the command and control layer 411 can be configured to transmit the optimized DPT-SP to an AHU controller or any other processor enabled BMS device. In some embodiments, the command and control layer 411 may transmit the optimized DPT-SP to a command and control feature of the energy management system 422.

Figure 6:
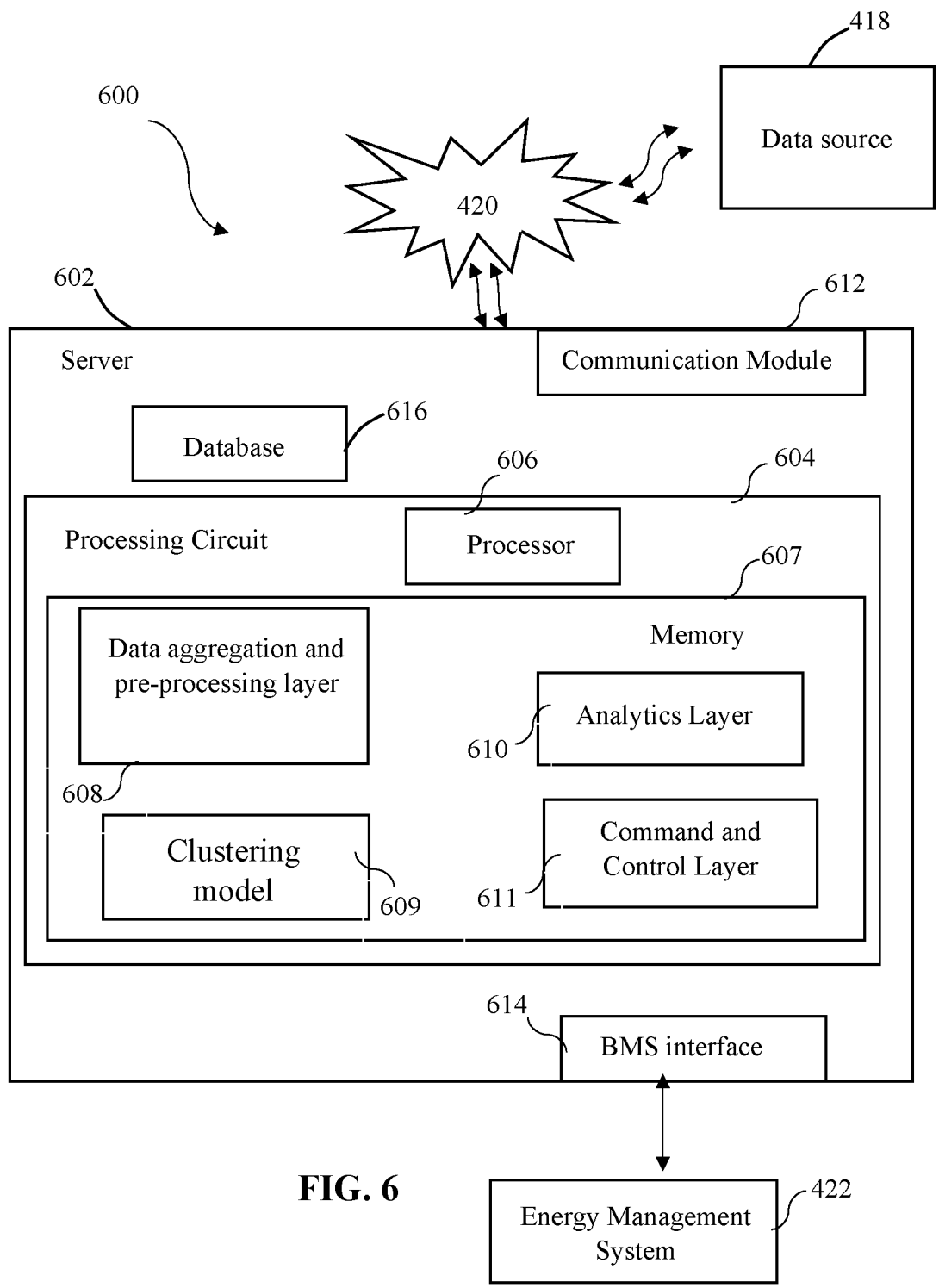
FIG. 6 is a block diagram of a system for automatic detection and clustering of variable air volume units, according to some embodiments.

Referring now to FIG. 6, a system 600 for detection and clustering of rogue VAVs, undersized VAVs, and oversized VAVs is depicted. In some embodiments, the system 600 can utilize machine learning, e.g., one or both of a supervised learning model and an unsupervised learning model.

The system 600 includes a server 602 and one or more data sources 418. The server 602 can be a remote server, a cloud server, or an on-premise server. The server 602 is communicatively coupled with the data source 418 to receive VAV data and AHU data, where VAV data and AHU data are received from multiple zones or sites.

The data source 418 can be a BMS supervisory controller 266 (shown in FIG. 2), a field controller, or any processor or microcontroller enabled upstream device of the BMS that is capable of transmitting the AHU data and the VAV data via a communication network 420. For example, the communication network 420 can be a BACnet network, a LonWorks network, a LAN, a WAN, the Internet, a cellular network, and the like. In some embodiments, the data source 418 may include remote controllers affiliated with one or more remote building management systems or automation systems.

The server 602 includes a processing circuit 604, a database 616, a communication module 612, and a BMS interface 614.

The communication module 612 can facilitate communication between the server 602 and one or more data sources 418. The BMS interface 614 may facilitate communication between the server 602 and an energy management system 622 of the BMS. In some embodiments, the BMS interface 614 may also provide communication between the server 602 and one or more client devices (not shown in figures).

The communication module 612 and the BMS interface 614 can be or include wired or wireless communications interfaces (e.g., jacks, antennas, transmitters, receivers, transceivers, wire terminals, etc.) for conducting data communications. In various embodiments, communications via the communication module 612 and the BMS interface 614 can be direct (e.g., local wired or wireless communications) or via the communication network 620 (e.g., a WAN, the Internet, a cellular network, etc.). For example, the communication module 612 and the BMS interface 614 can include an Ethernet card and port for sending and receiving data via an Ethernet-based communications link or network. In another example, the communication module 612 and the BMS interface 614 can include a Wi-Fi transceiver for communicating via a wireless communications network. In another example, one or both of the communication module 612 and the BMS interface 614 can include cellular or mobile phone communications transceivers. In some embodiments, the communication module 612 is a power line communications interface and the BMS interface 614 is an Ethernet interface. In other embodiments, both the communication module 612 and the BMS interface 614 are Ethernet interfaces or are the same Ethernet interface.

Still referring to FIG. 6, the processing circuit 604 includes a processor 606 and a memory 607. The processing circuit 604 can be communicably connected to the BMS interface 614 and/or the communication module 612 such that processing circuit 134 and the various components thereof can send and receive data via the BMS interface 614 and the communication module 612. The processor 606 can be implemented as a general purpose processor, an application specific integrated circuit (ASIC), one or more field programmable gate arrays (FPGAs), a group of processing components, or other suitable electronic processing components.

The memory 607 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 607 can be or include volatile memory or non-volatile memory. The memory 607 can include database components, object code components, script components, or any other type of information structure for supporting the various activities and information structures described in the present application. According to some embodiments, the memory 607 is communicably connected to the processor 606 via the processing circuit 604 and includes computer code for executing (e.g., by the processing circuit 604 and/or the processor 606) one or more processes described herein.

In some embodiments, the server 602 can be implemented as a single computer (e.g., one housing, a packaged units, etc.). In various other embodiments, the server 602 can be implemented across multiple devices or computers (e.g., that can exist in distributed locations).

Still referring to FIG. 6, the memory 607 can include a data aggregation and pre-processing layer 608, a clustering model 609, an analytics layer 610, and a command and control layer 611.

The data aggregation and pre-processing layer 608 can be configured to receive VAV data and AHU data from the database 616. In some embodiments, the data aggregation and pre-processing layer 608 may be enabled to directly receive VAV data and AHU data from one or more data sources 418. Further, the data aggregation and pre-processing layer 608 can aggregate and pre-processes VAV data and AHU data to handle undesired value(s).

The clustering model 609 can be enabled to receive the AHU data and the VAV data from the data aggregation and pre-processing layer 608. The clustering model 609 can be configured to automatically detect rogue VAVs, undersized VAVs, and oversized VAVs and cluster them accordingly. The clustering model 502 can be enabled to perform an equation driven detection of rogue, undersized, and oversized VAVs for clustering.

In some embodiments, the clustering model 609 can determine the VAV unit as rogue VAV when ((AHU Status is ON) and (VAV Damper Position is at 100 percent) and (absolute percentage error between DPT & DPT-SP<2%)). For an example, the clustering model 609 can tag rogue VAVs with either damper loose or mechanical failure when ((DPR-O>99 percent) and (SA-F<SAF-SP)). In another example, the clustering model 609 can tag rogue VAV with flow station faulty when DA-VP has flat line or is unreliable. In one example, the clustering model 609 tags the rogue VAV with damper overridden when ((DPR>99 percent) and (SA-F>SAF-SP)).

In some embodiments, the logic for identifying rogue VAVs and subsequently tagging them may be expressed as follows:

```
If (AHU Status is ON)) and (VAV Damper Position = 100 percent) and (absolute
percentage error between DPT & DPT-SP < 2 percent):
   Rogue
      if (DPR-O > 99 percent) and (SA-F < SAF-SP): Damper loose or
      mechanical failure
      else if DA-VP flat line or unreliable: Flow Station faulty
      else if (DPR > 99 percent) and (SA-F > SAF-SP): Damper overridden
Else
   NOT Rogue
```

Further, the clustering model 609 can determine the VAV unit as an oversized VAV unit if ((AHU Status is ON) and (absolute percentage error between ZN-T & ZNT-SP<10%) and (DPR-O<100%) and (absolute percentage error between SA-F & SAF-SP<10%) and (supply air flow setpoint is at minimum limit)). Further, if the percentage of error between the average DPR-O for two consecutive operation period is equal to zero, then the clustering model 609 can tag the oversized VAV unit as damper overridden. Still further, if the percentage of error between average DPR-O for two consecutive operation period is not equal to zero, then the clustering model 609 can tag the oversized VAV unit as verify flow limits.

In some embodiments, the logic for identifying oversized VAVs and subsequently tagging them may be expressed as follows:

Further, the analytics layer 610 can be configured to calculate the count of rogue VAVs, undersized VAVs, and oversized VAVs based on a pre-defined analytical programs. The list of AHUs and the count of the associated rogue VAVs, undersized VAVs, and oversized VAVs can be displayed on the client device(s) connected via the BMS interface 414.

The command and control layer 611 can be enabled to receive the details pertaining to the rogue VAVs from the clustering model 609. Based on this, the command and control layer 611 can be configured to determine an optimized duct static pressure setpoint (DPT-SP), e.g., by excluding the rogue VAVs.

```
If ((AHU Status is ON)) and (absolute % error between ZN-T & ZNT-SP < 10%)
and (DPR-O < 100%) and (absolute % error between SA-F & SAF-SP < 10%) and
(supply air flow set point is at minimum limit))
   Oversized
      if (% error between average DPR-O for 2 consecutive operation
      period) == 0: Damper overridden;
      else if (% error between average DPR-O for 2 consecutive operation
      period) != 0: Please adjust/verify flow limits
Else not oversized
```

Further, the clustering model 609 can determine the VAV unit as undersized VAV if ((AHU Status is ON) and (Zone Temperature (+difference of 2 degrees Celsius)>Zone Temperature Setpoint) and (VAV damper output<100%) and (Supply Air Flow−Supply Air Flow Setpoint=(+−10%)) and (supply air flow set point is at maximum limit)). Additionally, if the percentage of error between average DPR-O for two consecutive operation period is equal to zero, then the clustering model 609 can tag the undersized VAV unit as damper overridden. Still further, if the percentage of error between average DPR-O for two consecutive operation period is not equal to zero, then the clustering model 609 can tag the undersized VAV unit as verify flow limits.

In some embodiments, the logic for identifying undersized VAVs and subsequently tagging them may be expressed as follows:

Method for Automatic Detection and Clustering of Variable Air Volume Units

In some embodiments of the present disclosure, a method for automatic detection and clustering of VAVs is envisaged. Specifically, the method automatically can detect and cluster VAVs as one of rogue VAVs, undersized VAVs, or oversized VAVs.

Figure 7:
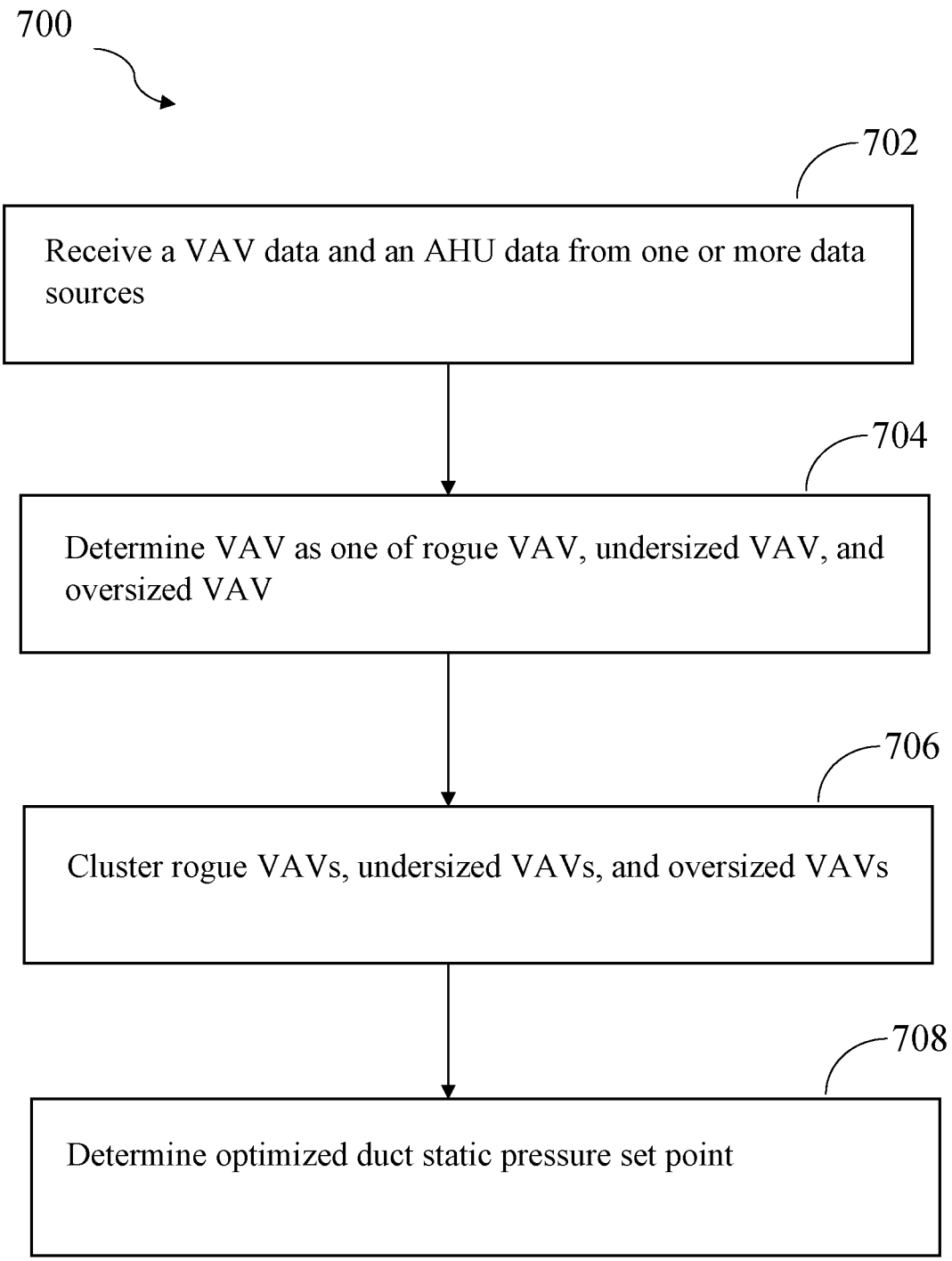
FIG. 7 is a flowchart depicting steps for clustering VAVs as rogue, undersized, and oversized VAVs.

Referring now to FIG. 7, a flowchart depicting steps for clustering VAVs as rogue, undersized, and oversized VAVs is shown. In some embodiments, the detecting and clustering method 700 is performed by a server 402. Alternatively, the detecting and clustering method 700 may be partially performed by another server, computing system or controller. In some embodiments, the server 402 can be one of a remote server, a cloud server, or an on-premises server.

```
If ((AHU Status is ON)) and (Zone Temperature (+diff 2 degrees Celsius) > Zone
Temperature Setpoint) and (VAV damper output < 100%) and (Supply Air Flow -
Supply Air Flow Setpoint = (+− 10%)) and (Supply Air Flow Setpoint is at
maximum limit))
   Undersized
      if (% error between average DPR-O for 2 consecutive operation period) ==
      0: Damper overridden;
      else if (% error between average DPR-O for 2 consecutive operation period)
      != 0: Please adjust/verify flow limits;
Else
   not undersized.
```

At step 702, the server 402 can be configured to receive VAV data and AHU data from one or more data sources 418. In some embodiments, the server 402 can be configured to periodically receive the VAV data and the AHU data. The VAV data and the AHU data may be associated with one or more sites or zones. In an example embodiment, the data source 418 can be one of a BMS supervisory controller 266 (shown in FIG. 2), a field controller, or any processor or microcontroller enabled upstream device of the BMS that is capable of transmitting the AHU data and the VAV data via a communication network 420.

At step 704, the server 402 is configured to determine VAVs as one of rogue VAV, undersized VAV, and oversized VAV. In some embodiments, the rogue VAVs can be determined by the server 402 when ((AHU Status is ON) and (VAV Damper Position is at 100 percent) and (absolute percentage error between DPT & DPT-SP<2%)).

In some embodiments, the oversized VAVs can be determined by the server 402 when ((AHU Status is ON) and (absolute percentage error between ZN-T & ZNT-SP<10%) and (DPR-O<100%) and (absolute percentage error between SA-F & SAF-SP<10%) and (supply air flow setpoint is at minimum limit)).

In some embodiments, the undersized VAVs can be determined by the server 402 when ((AHU Status is ON) and (Zone Temperature (+difference of 2 degrees Celsius)>Zone Temperature Setpoint) and (VAV damper output<100%) and (Supply Air Flow−Supply Air Flow Setpoint=(+−10%)) and (supply air flow set point is at maximum limit)).

At step 706, the server 402, is enabled to cluster rogue VAVs, undersized VAV, and oversized VAVs. In some embodiments, one or more rogue VAVs affiliated with common AHUs can be clustered together. Similarly, one or more oversized and undersized VAVs affiliated with common AHUs can be clustered together respectively.

At step 708, the server 402 can be enabled to optimize the duct static pressure setpoint (DPT-SP) for the AHU by excluding rogue VAVs from duct static pressure setpoint calculations.

In some embodiments, the method 700 may further include steps of tagging rogue VAVs, undersized VAVs, and oversized VAVs.

In some embodiments, rogue VAVs may be tagged as damper loose/mechanical failure, flow station faulty, or damper overridden. For example, the server 402 can tag the rogue VAV with damper loose or mechanical failure when ((DPR-O>99 percent) and (SA-F<SAF-SP)). In another example, the server 402 can tag the rogue VAV with flow station faulty when DA-VP has flat line or is unreliable. In some embodiments, the server 402 can tag the rogue VAV with damper overridden when ((DPR>99 percent) and (SA-F>SAF-SP)).

In some embodiments, the oversized VAVs may be tagged as damper overridden or verify flow limits. For example, if the percentage of error between the average DPR-O for two consecutive operation period is equal to zero, then the server 402 can tag the oversized VAV unit as damper overridden. Still further, if the percentage of error between the average DPR-O for two consecutive operation period is not equal to zero, then the clustering the server 402 can tag the oversized VAV unit as verify flow limits.

In some embodiments, the undersized VAVs may be tagged as damper overridden or verify flow limits. For an example, if the percentage of error between average DPR-O for two consecutive operation period is equal to zero, then the server 402 can tag the undersized VAV unit as damper overridden. Still further, if the percentage of error between average DPR-O for two consecutive operation period is not equal to zero, then the server 402 can tag the undersized VAV unit as verify flow limits.

In some embodiments, the method 700 may include isolating the suspect VAVs from the system and/or disconnecting the suspect VAVs from the system. In some embodiments, the suspect VAV can be removed the calculation or determination of the duct static pressure setpoint of the AHU. For example, the The suspect VAVs can be further inspected in order to adjust settings/configurations of the system and/or suspect VAV.

In some embodiments, the method 700 may include one or more steps that perform machine learning on the received AHU data and VAV data.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure. Further, the term "between" may be used to include endpoints, but embodiments are not limited thereto. For example, "between X and Y" may include X and Y or exclude X and Y.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
one or more memory devices configured to store instructions thereon that, when executed by one or more processors, cause the one or more processors to:
receive one or more of variable air volume unit (VAV) data or air handling unit (AHU) data from one or more data sources;
determine that one or more VAVs qualify as a suspect VAV in response to one or more conditions being satisfied by at least one of (i) the VAV data or (ii) the VAV data and the AHU data;
classify the suspect VAV as a first type of suspect VAV in response to a first set of the one or more conditions being satisfied;
classify the suspect VAV as a second type of suspect VAV in response to a second set of the one or more conditions being satisfied;
in response to the suspect VAV being classified as the first type of suspect VAV, remove a portion of the VAV data associated with the suspect VAV from a calculation of a duct static pressure setpoint (DPT-SP) for an AHU and operate building equipment to affect an airflow provided to one or more building zones using an adjusted value of the DPT-SP after removing the portion of the VAV data associated with the suspect VAV from the calculation of the DPT-SP; and
in response to the suspect VAV being classified as the second type of suspect VAV, increase or decrease the value of the DPT-SP and operate the building equipment to affect the airflow provided to the one or more building zones using the increased or decreased value of the DPT-SP.

2. The building management system of claim 1, wherein the suspect VAV is identified as a rogue VAV if the first set of the one or more conditions being satisfied, an undersized VAV if the second set of the one or more conditions being satisfied, or an oversized VAV if a third set of the one or more conditions being satisfied.

3. The building management system of claim 1, wherein the instructions further cause the one or more processors to tag the suspect VAV with one or more of a mechanical failure, a flow station that measures the air velocity pressure has failed, or an overridden damper.

4. The building management system of claim 3, wherein the instructions further cause the one or more processors to employ a machine learning model for tagging the suspect VAV.

5. The building management system of claim 1, wherein the AHU data includes one or more of a supply fan status (SF-S) or a duct static pressure (DPT), and the VAV data includes one or more of a discharge air velocity pressure (DA-VP), a supply air flow (SA-F), a supply air flow setpoint (SAF-SP), a damper output (DPR-O), a zone temperature (ZN-T), or a zone temperature setpoint (ZNT-SP).

6. The building management system of claim 5, wherein the suspect VAV is tagged as a rogue VAV if the AHU is on, a VAV damper position is set to a maximum, and a percentage error between the DPT and the DPT-SP is less than a first predetermined percentage.

7. The building management system of claim 6, wherein the suspect VAV is further tagged as having a loose damper or mechanical failure if the DPR-O is greater than a second predetermined percentage and the SA-F is less than SAF-SP,
wherein the suspect VAV is further tagged as a faulty flow station connected to the suspect VAV if the DA-VP has a constant value over a first predetermined amount of time; and
wherein the suspect VAV is further tagged as having an overridden damper if the DPR-O is greater than ZN-T, and the SA-F is greater than the SAF-SP.

8. The building management system of claim 5, wherein the suspect VAV is tagged as oversized if the AHU is on, a percentage difference between the ZN-T and the ZNT-SP is less than a third predetermined percentage, a difference between SA-F and SAF-SP is less than a fourth predetermined percentage, and the SAF-SP is at a minimum limit.

9. The building management system of claim 8, wherein the suspect VAV is further tagged as having an overridden damper if the DPR-O has a constant value for 2 or more consecutive operation periods.

10. The building management system of claim 5, wherein the suspect VAV is tagged as undersized if the AHU is on, the ZN-T is greater than the ZNT-SP, VAV damper output is less than 100 percent, a difference between the SA-F and the SAF-SP is within a predetermined threshold, and the SAF-SP is at a maximum limit.

11. The building management system of claim 10, wherein the instructions further cause the one or more processors to cluster two or more of the VAVs that are tagged as undersized VAVs together.

12. A method of monitoring and controlling building equipment, the method comprising:
receiving one or more of variable air volume unit (VAV) data or air handling unit (AHU) data from one or more data sources;
determining that one or more VAVs qualifies as a suspect VAV in response to one or more conditions being satisfied by at least one of (i) the VAV data or (ii) the VAV data and the AHU data;
classifying the suspect VAV as a first type of suspect VAV in response to a first set of the one or more conditions being satisfied;
classifying the suspect VAV as a second type of suspect VAV in response to a second set of the one or more conditions being satisfied;
in response to the suspect VAV being classified as the first type of suspect VAV, removing a portion of the VAV data associated with the suspect VAV from a calculation of a duct static pressure setpoint (DPT-SP) for an AHU and operating building equipment to affect an airflow provided to one or more building zones using an adjusted value of the DPT-SP after removing the portion of the VAV data associated with the suspect VAV from the calculation of the DPT-SP; and
in response to the suspect VAV being classified as the second type of suspect VAV, increasing or decreasing the value of the DPT-SP and operating the building equipment to affect the airflow provided to the one or more building zones using the increased or decreased value of the DPT-SP.

13. The method of claim 12, wherein the determining the one or more VAVs as the suspect VAV includes tagging the suspect VAV as:
- a rogue VAV if the first set of the one or more conditions being satisfied with one or more of having a mechanical failure, a flow station that measures the air velocity pressure has failed, or an overridden damper;
- an undersized VAV if the second set of the one or more conditions being satisfied with one or more of having an overridden damper or having flow limits that require verification; and
- an oversized VAV if a third set of the one or more conditions being satisfied with one or more of having an overridden damper or having flow limits that exceed a predetermined value.

14. The method of claim 13, wherein the AHU data includes one or more of a supply fan status (SF-S) or a duct static pressure (DPT), and the VAV data includes one or more of a discharge air velocity pressure (DA-VP), a supply air flow (SA-F), a supply air flow setpoint (SAF-SP), a damper output (DPR-O), a zone temperature (ZN-T), or a zone temperature setpoint (ZNT-SP).

15. The method of claim 14, wherein the suspect VAV is further tagged as:
- the rogue VAV if the AHU is on, a VAV damper position is set to a maximum, and a percentage error between the DPT and the DPT-SP is less than a first predetermined percentage;
- having a loose damper or mechanical failure if the DPR-O is greater than a second predetermined percentage and the SA-F is less than SAF-SP,
- a faulty flow station connected to the suspect VAV if the DA-VP has a constant value over a first predetermined amount of time; and
- as having an overridden damper if the DPR-O is greater than ZN-T, and the SA-F is greater than the SAF-SP.

16. The method of claim 14, wherein the suspect VAV is further tagged as:
- oversized if the AHU is on, a percentage difference between the ZN-T and the ZNT-SP is less than a third predetermined percentage, a difference between SA-F and SAF-SP is less than a fourth predetermined percentage, and a supply air flow setpoint is at a minimum limit; and
- having an overridden damper if the DPR-O has a constant value for 2 or more consecutive operation periods.

17. The method of claim 14, wherein the suspect VAV is further tagged as undersized if the AHU is on, the ZN-T is greater than the ZNT-SP, VAV damper output is less than 100 percent, a difference between the SA-F and the SAF-SP is within a predetermined threshold, and the SAF-SP is at a maximum limit.

18. The method of claim 13, wherein the determining the one or more VAVs as a suspect VAV comprises employing a machine learning model.

19. A building management system comprising:
- one or more variable air volume units (VAVs) configured to provide air flow into a building;
- an air handling unit (AHU) configured to provide the air flow to the one or more VAVs; and
- one or more memory devices configured to store instructions thereon that, when executed by one or more processors, cause the one or more processors to:
  - receive VAV data from the one or more of VAVs or AHU data from the AHU;
  - determine that one or more VAVs as a suspect VAV in response to one or more conditions being satisfied by at least one of (i) the VAV data or (ii) the VAV data and the AHU data;
  - classify the suspect VAV as a first type of suspect VAV in response to a first set of the one or more conditions being satisfied;
  - classify the suspect VAV as a second type of suspect VAV in response to a second set of the one or more conditions being satisfied
  - in response to the suspect VAV being classified as the first type of suspect VAV, remove a portion of the VAV data associated with the suspect VAV from a calculation of a duct static pressure setpoint for the AHU and operate building equipment to affect an airflow provided to one or more building zones using an adjusted value of the duct static pressure setpoint after removing the portion of the VAV data associated with the suspect VAV from the calculation of the duct static pressure setpoint; and
  - in response to the suspect VAV being classified as the second type of suspect VAV, increase or decrease the value of the DPT-SP and operate the building equipment to affect the airflow provided to the one or more building zones using the increased or decreased value of the DPT-SP.

20. The building management system of claim 19, where the one or more processors employs a machine learning model for tagging the suspect VAV.

* * * * *